United States Patent [19]
Ziemer et al.

[11] Patent Number: 6,165,372
[45] Date of Patent: Dec. 26, 2000

[54] INJECTION QUILL FOR WATER TREATMENT

[75] Inventors: Robert R. Ziemer, Gwynedd Valley, Pa.; Anthony M. Rossi, Vincentown, N.J.

[73] Assignee: Betzdearborn Inc., Trevose, Pa.

[21] Appl. No.: 09/372,286

[22] Filed: Aug. 11, 1999

[51] Int. Cl.[7] .................................................. C02F 1/00
[52] U.S. Cl. ................................. 210/749; 210/198.1
[58] Field of Search .................................. 210/749, 198.1

[56] References Cited

U.S. PATENT DOCUMENTS

| | | | |
|---|---|---|---|
| 191,775 | 6/1877 | Parsons . | |
| 3,918,491 | 11/1975 | Weltmer | 239/598 |
| 4,286,900 | 9/1981 | Sugimoto et al. | 405/269 |
| 4,331,262 | 5/1982 | Snyder et al. | 222/37 |
| 4,986,782 | 1/1991 | Severtson | 239/74 |
| 5,008,075 | 4/1991 | Rufolo | 422/6 |
| 5,053,004 | 10/1991 | Markel et al. | 604/43 |
| 5,127,441 | 7/1992 | Rains | 138/114 |
| 5,161,417 | 11/1992 | Strong et al. | 73/863.86 |
| 5,188,593 | 2/1993 | Martin | 604/43 |
| 5,195,962 | 3/1993 | Martin et al. | 604/43 |
| 5,277,250 | 1/1994 | Dela | 166/90 |
| 5,336,220 | 8/1994 | Ryan et al. | 604/22 |
| 5,387,249 | 2/1995 | Wiecorek | 4/225.1 |
| 5,400,602 | 3/1995 | Chang et al. | 62/50.7 |
| 5,400,828 | 3/1995 | Ziu et al. | 138/113 |
| 5,409,455 | 4/1995 | Belden | 604/43 |
| 5,409,465 | 4/1995 | Boggs et al. | 604/191 |
| 5,489,931 | 2/1996 | Shibata et al. | 347/85 |
| 5,503,191 | 4/1996 | Morris | 138/111 |
| 5,514,284 | 5/1996 | Uban et al. | 210/709 |
| 5,569,182 | 10/1996 | Twardowski et al. | 604/43 |
| 5,687,993 | 11/1997 | Brim | 285/131 |
| 5,722,698 | 3/1998 | Amoretti | 285/123.15 |
| 5,735,813 | 4/1998 | Lewis | 604/43 |

Primary Examiner—David A. Simmons
Assistant Examiner—Betsey Morrison Hoey
Attorney, Agent, or Firm—Perman & Green, LLP

[57] ABSTRACT

First and second quill members introduce water treatment chemicals to a water stream advancing within water containing equipment having only a single opening. The first quill member extends through a sealed opening on a wall of the equipment and has a first inlet located outside of the equipment, a first outlet located within the equipment in the path of the advancing water stream, and a first passage extending between the first and second inlets. The second quill member is mounted on the first quill member and has a second inlet located outside of the equipment and a second outlet located within the equipment in the path of the advancing water stream. The second outlet is spaced from the first outlet and a second passage, coaxial with the first, extends between the second inlet and the second outlet. A first chemical substance flowing through the first passage and issuing from the first outlet into the water stream thereby avoids mixing in a concentrated form with a second chemical substance flowing through the second passage and issuing from the second outlet into the water stream. The outlet tip ends for the outlet tubes are beveled into the direction of flow of the advancing water stream and each beveled tip end may have a notch formed at an extremity to increase turbulence. The first and second outlets are preferably located at maximum distances from each other and from the walls of the water containing equipment.

4 Claims, 2 Drawing Sheets

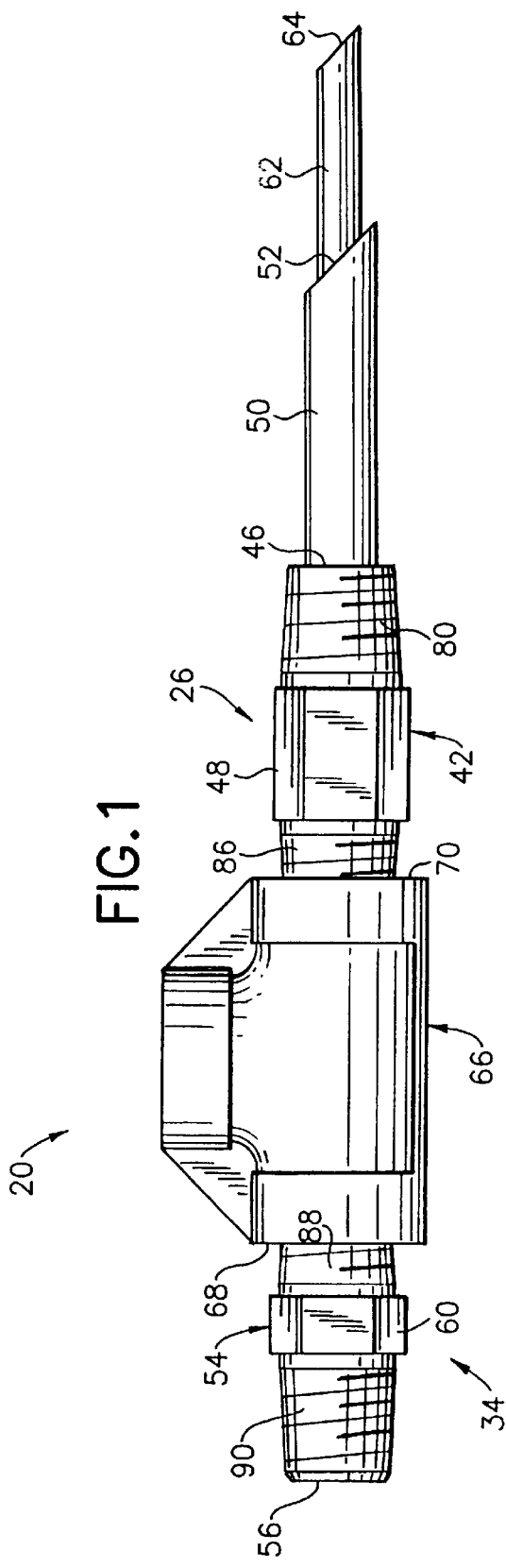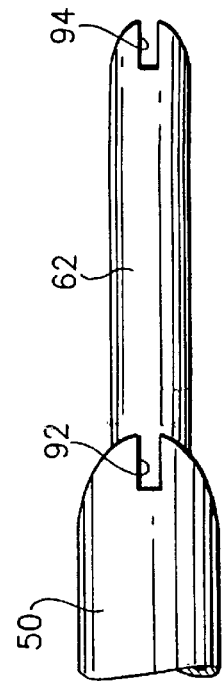

INJECTION QUILL FOR WATER TREATMENT

BACKGROUND OF THE INVENTION

1. Field of the Invention

The present invention relates generally to apparatus for the chemical treatment of water and, more particularly, to apparatus for injecting two or more incompatible chemicals into a water stream to be treated while advancing within a vessel into which only one opening is available. Throughout this disclosure, the term "water" will be taken to include liquid $H_2O$ as well as water in its vaporous form, that is, steam.

2. Description of the Prior Art

A number of patents are definitive of the present state of the art of water treatment. For example, as disclosed in U.S. Pat. No. 5,514,284 to Uban et al., ozone generation tubes are positioned upstream of filtration beds and downstream of the point where water treatment chemicals are added to the water. By properly arranging the tubes in an array, the tubes will serve as a static mixer Water that passes through the array is agitated, thereby mixing the additive chemicals into the water prior to filtration.

U.S. Pat. No. 5,387,249 to Wiecorek discloses a self-contained chemical injection device for use with toilets which assures that the chemical never comes into contact with the other components in the tank of a toilet bowl, resulting in a more efficient and environmentally safe chemical treatment process for the toilet bowl water.

U.S. Pat. No. 4,286,900 to Sugimote et al. discloses a device for precisely injecting dual chemical fluids for mixing in the ground while preventing earth and sand around the injection device from flowing back through the injection port or ports into the interior of the injection device.

U.S. Pat. No. 5,277,250 to Dela discloses an injector for injecting a liquid treatment chemical into a moving body of liquid in a pipe. The injector includes an elongated hollow quill member having a stem portion of a length to span substantially the inside diameter of the pipe. The stem portion is provided along substantially its entire length with a substantially uniform set of jet openings for injecting the cross section of the body of liquid with a number of chemical treatment jet streams so that the cross section of the body of liquid is treated uniformly across its diametrical cross section.

Traditionally several water treatment chemicals are diluted in a mix tank and fed over a period of time, typically one day. Feed is to a moving bulk stream in the system to be treated. This stream is typically water or steam. Injection of mixture of chemicals is by a single quill into the center of the moving stream.

Water treatment chemicals must be diluted to about 10% with water when fed in this manner. If mixed neat, that is, undiluted, precipitation of one or more of the components is likely to occur. Fittings to accept the injection quill are typically welded into the vessel or piping.

There is a growing trend to eliminate the makedown or dilution step and simply feed each chemical neat directly from the storage tank. This is a safety as well as a labor saving practice. Since two chemical products cannot be mixed neat, each one must have a separate feed or an injection point into the system. This currently requires taking the system off-line and welding a new injection fitting into the system for each additional chemical to be fed.

It was with knowledge of the foregoing state of the technology that the present invention has been conceived and is now reduced to practice.

SUMMARY OF THE INVENTION

According to the present invention, first and second quill members introduce water treatment chemicals to a water stream advancing within water containing equipment having only a single opening. The first quill member extends through a sealed opening on a wall of the equipment and has a first inlet located outside of the equipment, a first outlet located within the equipment in the path of the advancing water stream, and a first passage extending between the first and second inlets. The second quill member is mounted on the first quill member and has a second inlet located outside of the equipment and a second outlet located within the equipment in the path of the advancing water stream. The second outlet is spaced from the first outlet and a second passage, coaxial with the first, extends between the second inlet and the second outlet. A first chemical substance flowing through the first passage and issuing from the first outlet into the water stream thereby avoids mixing in a concentrated form with a second chemical substance flowing through the second passage and issuing from the second outlet into the water stream. The outlet tip ends for the outlet tubes are beveled into the direction of flow of the advancing water stream and each tip end may have a notch formed at an extremity to increase turbulence. The first and second outlets are preferably located at maximum distances from each other and from the walls of the water containing equipment.

The proposed invention will allow two chemicals to be fed neat through one injection point without mixing. The invention consists of a quill within a quill. Chemical A flows through the center quill while Chemical B flows through the larger outer quill and around the exterior of the center quill. The center quill will project further into the moving stream than the out quill. Each chemical then mixes with the moving bulk stream separately. The need to install an additional fitting into the pipe or vessel is eliminated.

In short, the present invention is intended as an improvement of the device disclosed in the Dela patent. That is, in Dela, the elongated hollow quill member is already mounted on the pipe into which a single liquid treatment chemical is injected. For purposes of the present invention, it is desired to inject a second liquid treatment chemical but without requiring the generating a second entry into the pipe. At the same time, it is desired that the two chemicals being injected do not mix before they are fully diluted by the water stream into which they are injected. The injection quill of the present invention is designed to allow chemicals to be diluted by the flowing stream of water or steam without ever mixing in the concentrated form. It is intended that the chemicals never mix in the concentrated form either inside or outside the quill. The main goal of the quill of the invention is to provide an approach for injecting two incompatible chemicals into a moving stream where only one opening is available.

A primary feature, then, of the present invention is the provision of apparatus and a resulting technique for injecting two incompatible chemicals into a water stream to be treated while advancing within a vessel, which may be a pipe, into which only one opening is available.

Another feature of the present invention is the provision of such a system according to which the two chemicals being injected do not mix before they are fully diluted by the water stream into which they are injected.

Still another feature of the present invention is the provision of such a system which utilizes commonly available materials, can be easily fabricated and is inexpensive to install and maintain.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

FIG. 1 is a side elevation view of apparatus embodying the present invention;

FIG. 3 is a detail plan view of a portion of the apparatus illustrated in FIG. 1.

DETAILED DESCRIPTION OF THE PREFERRED EMBODIMENT

Figure 2:
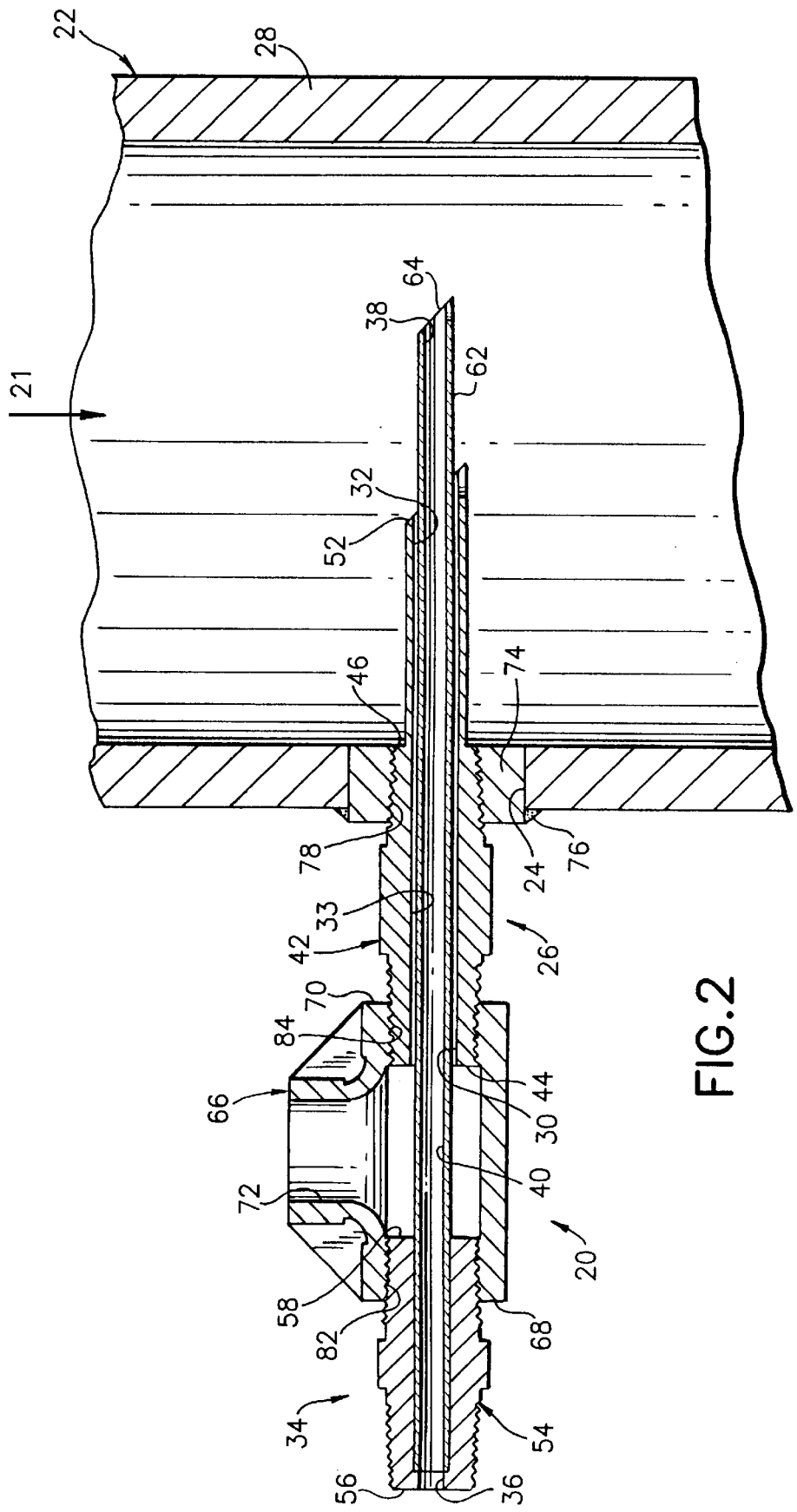
FIG. 2 is a elevation view, in section, of the apparatus illustrated in FIG. 1.

Referring to FIGS. 1 and 2, there are shown elevation views, FIG. 2 being in section, of apparatus 20 incorporating features of the present invention for introducing water treatment chemicals to a water stream not shown but advancing in the direction of an arrow 21 within water containing equipment 22 having only a single opening 24 for introduction of the chemicals. Although the present invention will be described with reference to the single embodiment shown in the drawings, it should be understood that the present invention can be embodied in many alternate forms of embodiments. In addition, any suitable size, shape or type of elements or materials could be used.

The apparatus 20 includes a first quill member 26 mounted through the opening 24 on a wall 28 of the water containing equipment 22 which may be a pipe, for example. As seen in FIG. 2, the quill member 26 may have an inlet 30 located outside of the equipment 22, an outlet 32 located within the equipment 22 in the path of the advancing water stream (see arrow 21), and a first passage 33 extending between the inlet and the outlet.

A second quill member 34 is mounted on the first quill member 26 and has an inlet 36 located outside of the water containing equipment 22 and an outlet 38 located within the water containing equipment in the path of the advancing water stream indicated by arrow 21. The outlet 38 is spaced from the outlet 32, and a second passage 40 extends between the second inlet and the second outlet, the second passage being coaxial with the first passage 33. With this construction, a first chemical substance flowing through the first passage 33 and issuing from the first outlet 32 into the water stream (arrow 21) avoids mixing in a concentrated form with a second chemical substance flowing through the second passage 40 and issuing from the second outlet 38 into the water stream.

With continued reference to FIGS. 1 and 2, the first quill member 26 is seen to include a first elongated fitting 42 extending between a proximal attachment end 44 and a distal attachment end 46 and having a first gripping segment 48 intermediate the attachment ends. The gripping segment 48 may include, for example, a hex head for intimate reception thereon of a standard hex head wrench.

A first outlet tube 50 is integral with the fitting 42 and projects to an outlet tip end 52 in a direction away from the distal attachment end 46. Preferably, the outlet tip end 52 is beveled into the direction of flow of the advancing water stream, most preferably at an angle of 45° relative to the longitudinal axis of the outlet tube 50.

In a similar fashion, the second quill member 34 includes a second elongated fitting 54 extending between a proximal attachment end 56 and a distal attachment end 58 and having a second gripping segment 60 intermediate the attachment ends. As with the gripping segment 48, the gripping segment 60 may include, for example, a hex head for intimate reception of a standard hex head wrench. A second outlet tube 62 is integral with the elongated fitting 54 and projects to an outlet tip end 64 in a direction away from the distal attachment end 58.

The apparatus 20 also includes a T-junction fitting 66 which has opposed aligned inlet and outlet ends, 68, 70, respectively, and a transversely extending inlet end 72 in communication with the opposed inlet and outlet ends. The outlet end 70 is joined with the proximal attachment end 44 of the first elongated fitting 42 and the inlet end 68 is joined with the distal attachment end 58 of the second elongated fitting 54. The second outlet tube 62 has an outer diameter smaller than the inner diameter of the first passage 33 and extends through the first passage.

Thus, the first chemical substance is caused to flow through the transversely extending inlet end 72, then through the first passage 33, issuing from the first outlet 32 while the second chemical substance is caused to flow through the aligned inlet end 68 and through the second outlet tube 62, issuing from the second outlet 38.

While it was earlier described that the first quill member 26 is mounted through the opening 24 on the wall 28 of the water containing equipment 22, it would be more accurate to say that an annular coupling member 74 is fitted into the opening 24, then attached to the wall 28 as by a welded joint 76. Preferably, the coupling member 74 has a tapped bore 78, the distal attachment end 46 of the first elongated fitting 42 including a male tapped member 80 for threaded engagement with the tapped bore 78 of the coupling member.

Also, preferably, each of the aligned inlet and outlet ends of the T-junction fitting has a tapped bore, 82, 84, respectively, and the proximal attachment end of the first elongated fitting 42 includes a male tapped member 86 for threaded engagement with the tapped bore 84 of the aligned outlet end 70 of the T-junction fitting 66. In a similar fashion, the distal attachment end 58 of the second elongated fitting 54 includes a male tapped member 88 for threaded engagement with the tapped bore 82 of the aligned inlet end 68 of the T-junction fitting 66. For symmetry, the proximal attachment end 56 of the second elongated fitting 54 includes a male tapped member 90 for threaded engagement with a source of the second chemical substance. In a similar fashion, the transverse inlet end 72 of the T-junction fitting 66 may be suitably connected to a source (not shown) of the first chemical substance.

In order to improve mixing of the chemical substances within the water containing equipment 22, the outlet tip ends 52, 64 for the first and second outlet tubes, 50, 62, respectively, have notches 92, 94 (FIG. 3) formed at an extremity thereof to increase turbulence in the advancing water stream and thereby mixing of the chemical substances.

It was earlier mentioned that the outlets for the two chemical substances are preferably located at maximum distances from each other and from the walls of the water containing equipment. Thus, viewing FIG. 2, in the instance that the water containing equipment 22 has a cylindrical wall 28 with an inner diameter, it would be preferable the outlets 32 and 38 each lie on a diameter of the water containing equipment, outlet 32 being located at a distance of about one-third of the diameter of the equipment from a defined location on the wall and the outlet 38 being located at a distance of about two-thirds of the diameter of the equipment from the defined location on the wall.

While preferred embodiments of the invention have been disclosed in detail, it should be understood by those skilled in the art that various other modifications may be made to the illustrated embodiments without departing from the scope of the invention as described in the specification and defined in the appended claims. For example, it is considered to be within the scope of the invention for the apparatus 20 to include multiple nested quill members 34 of a number equivalent to the number of chemicals to be introduced to the water stream.

What is claimed is:

1. A method of introducing water treatment chemicals to a water stream advancing within water containing equipment having only a single opening for introduction of the chemicals, the method comprising the steps of:

(a) mounting a first quill member extending sealingly through the opening on the wall of the water containing equipment so as to have a first inlet located outside of the water containing equipment, a first outlet located within the water containing equipment in the path of the advancing water stream, and a first passage extending between the first inlet and the first outlet;

(b) mounting a second quill member on the first quill member so as to have a second inlet located outside of the water containing equipment, a second outlet located within the water containing equipment in the path of the advancing water stream, the second outlet being spaced from the first outlet, and a second passage extending between the second inlet and the second outlet, the second passage being coaxial with the first passage;

(c) introducing a first chemical substance for flow through the first passage so as to issue from the first outlet into the water stream;

(d) introducing a second chemical substance for flow through the second passage so as to issue from the second outlet into the water stream, whereby the first and second chemical substances avoid mixing in a concentrated form in the advancing water stream.

2. A method as set forth in claim 1
wherein each of the first and second quill members has an outlet tube projecting to an outlet tip end containing the first and second inlets, respectively, and including the step of:

(e) beveling the outlet tip ends for the first and second outlet tubes, respectively, into the direction of flow of the advancing water stream.

3. A method as set forth in claim 2 including the step of:

(e) forming the outlet tip ends for the first and second outlet tubes with a notch at an extremity thereof to increase turbulence in the advancing water stream in the region thereof.

4. A method as set forth in claim 2
wherein the water containing equipment has a cylindrical wall with an inner diameter; and including the steps of:

(f) positioning the first and second outlets such that each lies on a diameter of the water containing equipment;

(g) locating the first outlet at a distance of about one-third of the diameter of the water containing equipment from a defined location on the wall thereof; and (h) locating the second outlet at a distance of about two-thirds of the diameter of the water containing equipment from the defined location on the wall thereof.

* * * * *